US008284039B2

(12) United States Patent
Baker et al.

(10) Patent No.: US 8,284,039 B2
(45) Date of Patent: Oct. 9, 2012

(54) VEHICLE MONITORING SYSTEM WITH POWER CONSUMPTION MANAGEMENT

(75) Inventors: Lawrence G. Baker, Cincinnati, OH (US); Michael V. Paredes, Indianapolis, IN (US)

(73) Assignee: Earthwave Technologies, Inc., Indianapolis, IN (US)

( * ) Notice: Subject to any disclaimer, the term of this patent is extended or adjusted under 35 U.S.C. 154(b) by 1039 days.

(21) Appl. No.: 12/245,281

(22) Filed: Oct. 3, 2008

(65) Prior Publication Data

US 2009/0224869 A1 Sep. 10, 2009

Related U.S. Application Data

(60) Provisional application No. 61/068,161, filed on Mar. 5, 2008.

(51) Int. Cl.
*B60Q 1/00* (2006.01)

(52) U.S. Cl. .......... 340/439; 340/5.1; 702/188; 702/186

(58) Field of Classification Search .................. 340/5.1, 340/438, 439; 702/186, 188; 379/32.01, 379/29.01

See application file for complete search history.

(56) References Cited

U.S. PATENT DOCUMENTS

| | | | | |
|---|---|---|---|---|
| 6,535,116 | B1 * | 3/2003 | Zhou | 340/447 |
| 7,564,350 | B2 * | 7/2009 | Boman et al. | 340/545.6 |
| 7,928,735 | B2 * | 4/2011 | Huang et al. | 324/426 |
| 8,140,358 | B1 * | 3/2012 | Ling et al. | 705/4 |
| 2001/0013826 | A1 * | 8/2001 | Ahmed et al. | 340/439 |
| 2002/0130771 | A1 * | 9/2002 | Osborne et al. | 340/438 |
| 2004/0019461 | A1 * | 1/2004 | Bouse et al. | 702/188 |
| 2004/0249534 | A1 * | 12/2004 | Yamada et al. | 701/36 |
| 2010/0181827 | A1 * | 7/2010 | Cunningham et al. | 307/9.1 |

* cited by examiner

*Primary Examiner* — Eric M Blount
(74) *Attorney, Agent, or Firm* — Bruce J. Bowman

(57) ABSTRACT

A system, method and device for monitoring a vehicle is provided wherein a vehicle monitoring device regulates its power consumption of a host power source based upon determined states of operation of the vehicle. The power consumption management scheme of the monitoring device utilizes the following modes of operation to regulate power consumption: a work mode, a transport mode, and sleep mode, and a deep sleep mode. The mode of operation of the monitoring device depends on the determined state of vehicle operation. The monitoring device utilizes the various states of operation to power down certain portions of the monitoring device in order to reduce the electric power consumed by the monitoring device. A communication network is adapted to communicate the vehicle data to an end user via an access device. The communication network is also adapted to communicate end-user data via an access device to the monitoring system. The power consumption management scheme of the monitoring device may be remotely configurable by the end user in order to customize the monitoring device's utilization of the stored energy resident within the host power source.

41 Claims, 8 Drawing Sheets

VEHICLE MONITORING SYSTEM WITH POWER CONSUMPTION MANAGEMENT

RELATED APPLICATIONS

This application claims the benefit of and/or priority to U.S. Provisional Patent Application Ser. No. 61/068,161 filed Mar. 5, 2008 titled "System, Method and Device for Monitoring Equipment Status", the entire contents of which is specifically incorporated herein by this reference.

FIELD OF THE INVENTION

The present invention relates generally to a system and method for monitoring a vehicle and, more particularly, to a system and method for monitoring a vehicle in a manner that optimizes consumption of a host power source given the vehicle's operational status.

BACKGROUND OF THE INVENTION

To effectively manage vehicles, heavy equipment and related machinery, it is essential that accurate information relating to the operation of such equipment be monitored, recorded, and analyzed. It is known within the prior art to employ device monitors that track and record critical data relating to the operation of one or more vehicles in order to effectively implement cost-effective decisions regarding the continued use or maintenance of such equipment. Such monitoring devices require a host power source. Unfortunately, current monitoring systems do not regulate the amount of electrical current consumed from their host power source based upon the operational state of the vehicle being monitored. Current monitoring devices either operate in full power simultaneously with the operation of the motor displaced within the vehicle being monitored (meaning that they are non-operational when the motor of the monitored equipment is not operational); or, the monitoring device continues to run at full power even though the motor of the vehicle is not operational.

When the monitoring device continues to operate at full power while the vehicle is not operational, the battery of the host vehicle (or a self-contained battery of the monitor, if so equipped) is eventually drained of power thereby rendering the monitoring device inoperable. In any event, whether the monitoring device is designed to operate only when the motor of the vehicle is operational, or whether the monitoring device becomes inoperable as a result of a drained battery during prolonged periods where the vehicle is not in use (where the motor is not charging the host battery) or where the monitoring device only utilizes a self contained battery that is not recharged by the vehicle, valuable data pertaining to the vehicle's operation cannot be captured or transmitted to the end users.

Thus, it would be desirable to have an equipment monitoring system method and/or device which overcomes these and other shortcomings of the prior art.

SUMMARY OF THE INVENTION

The present invention is an electronic vehicle monitoring system, method and/or device that regulates power consumption of a host power source based on operational status of the monitored vehicle. Regulation of power consumption is implemented through a power consumption management scheme.

In one form the power consumption management scheme is configurable. Such configuration is accomplished through a direct connection with the present device or via a remote connection (such as the Internet, a cellular system, short range wireless, or the like).

The power consumption management scheme changes the power consumption needs of the electronic vehicle monitoring device via power consumption modes that are selected based upon operational states of the vehicle as discerned through acquisition of vehicle operational data. Exemplary power consumption modes include a work mode, a transport mode, a sleep mode, and a deep sleep mode.

Each power consumption mode regulates the use of power from the host power source by the electronic vehicle monitoring device. In work mode the monitoring device draws maximum current to power all of the components of the device. In transport mode the monitoring device draws maximum current on a periodic basis to power the components necessary to send vehicle location data to internal memory and/or a communication network. In sleep mode, the monitoring device shuts down many components and puts the processor of the monitoring device into a simple form of operation where only hard-wired sensors for obtaining vehicle operational data are monitored for operational status. The monitoring device periodically briefly awakens from the simple form of operation (pursuant to a predetermined time scheme resident within the monitoring device) to convert to the work mode for the purpose of sending data to internal memory and/or transmitting data to an end user. In deep sleep mode, the monitoring device shuts down all components except for the hard-wired sensors which continue to monitor the operational status of the vehicle.

In an embodiment thereof, a configurable power consumption management scheme is resident within the monitoring device to establish parameters under which the various power consumption modes are defined and managed relative to the determined operational status of the monitored vehicle. The power consumption modes are again generally defined as a work mode, a transport mode, a sleep mode, and a deep sleep mode.

The monitoring device through the power consumption management scheme selects through the power consumption management scheme the work mode when the determined operational status of the monitored vehicle indicates that the monitored vehicle is actively performing a work function. The definition of "work function" may be different depending on the type of vehicle being monitored. In those vehicles where a motor is utilized at least in part to charge the host power source which energizes the monitoring device, a work function is always deemed to exist at such time when the motor is operational (and the monitoring device is being charged). It is also possible that a vehicle could accomplish a work function while not having an operational engine. For example, various construction implements are towed behind a motorized vehicle and are used for various construction activities such as, but not limited to: scraping the earth, watering the earth, or otherwise distributing materials upon the earth or into the atmosphere. Such motorless vehicles are many times performing a work function while moving about the earth. Another example of a motorless vehicle performing a work function is a cargo container where the monitoring device is configured to sense the presence of cargo within the cargo container while the cargo container is physically moving across the earth. In work mode the monitoring device draws maximum current to power all components monitored or controlled by the monitoring device.

The transport mode is selected when the determined operational status of the monitored vehicle indicates that the monitored vehicle is moving across the earth without performing a work function. For example, where a motorized vehicle's motor is not functioning and the vehicle is moving across the earth at a certain speed, and the vehicle has no defined work function associated with this operational state, the monitoring device assumes that the vehicle is being transported. In another example, where the monitoring device does not sense the presence of cargo within a container or otherwise sense other defined work functions, the monitoring device would place itself into transport mode. In the transport mode the monitoring device draws maximum current at predefined intervals to power the components necessary to store data to internal memory related to location of the monitored vehicle and/or transmit said data related to the vehicle's location to a communications network. The monitoring device remains in the transport mode until it determines that a transport condition no longer exists. After exiting the transport mode, the monitoring device resumes the last operational mode executed before the event which prompted the monitoring device to be placed into the transport mode.

The sleep mode is selected when the determined operational status of the monitored vehicle indicates that the monitored vehicle is no longer performing a work function for a predefined period of time. In the sleep mode, the monitoring device shuts down many components and puts its processor into a simple form of operation where only the hard-wired sensors are monitored for operational status. The monitoring device periodically briefly awakens, at predefined time intervals, from the simple form of operation to work mode for the purpose of storing data related to the operation of the vehicle within the monitoring device and/or transmit said data related to the vehicle's operation to a communications network. During sleep mode the monitoring device operates in conformance with its predefined parameters for determining: 1) when it is scheduled to briefly awaken from sleep mode, 2) the duration in which the monitoring device is to remain awake before reverting back to sleep mode, and 3) the total number of sleep/awakened cycles (defined in time) that are permissible before the monitoring device places itself into a deep sleep mode.

In the deep sleep mode, the monitoring device shuts down all components except for the hard-wired sensors which continue to monitor the operational status of the vehicle. The monitoring device remains in the deep sleep mode until it detects that the vehicle is being transported, or until it detects a work function.

By operating in the transport mode, sleep mode, or deep sleep mode when the host power source is not being charged, such as when the motor of the vehicle is non-operational, the monitoring device lessens its power consumption requirements from a host power source which is either internal and/or external to the monitoring device. The parameters of the power consumption management scheme are applied against the various vehicle operational data acquired through sensors connected to the monitoring device in order to determine the correct operational mode.

The data collected, saved and/or transmitted by the present monitoring device additionally includes data related to the times and durations in which the monitoring device is operational within each operational mode. The monitoring device detects, collects, saves and/or transmits data relating to the use of the host vehicle and the operational data of the host vehicle. This data is analyzed, compiled into useful reports, and otherwise displayed in a meaningful manner which assists the end-user in understanding the historical use of the monitored vehicle, and also assists the end user in making informed decisions as to future employment of the monitored vehicle. This includes modifying parameters of the power consumption management scheme accordingly.

In another embodiment, a method for monitoring a vehicle is provided. According to this method, an electronic monitoring device regulates electrical current consumed by the electronic monitoring device relative to operational status or state of a monitored vehicle.

The more important features of the invention have been outlined rather broadly in order that the detailed description thereof that follows may be better understood, and in order that the present contribution to the art may be better appreciated. There are, of course additional features of the invention that will be described hereinafter and which may form the subject matter of claims appended hereto. Those skilled in the art will appreciate the concept upon which this disclosure is based, and may readily be utilized as a basis for designing other structures, methods and systems for carrying out the purposes of the present invention. It is important, therefore, that the claims be regarded as including such equivalent constructions insofar as they do not depart from the spirit and scope of the present invention.

These, together with objects of the invention, along with the various features of novelty which characterize the invention, are pointed out with particularity in the following description and claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The above mentioned and other features, advantages and objects of this invention, and the manner of attaining them, will become apparent and the invention itself will be better understood by reference to the following description of embodiments of the invention taken in conjunction with the accompanying drawings, wherein.

Like reference numerals indicate the same or similar parts throughout the several figures.

A full discussion of the features, functions and/or configuration of the components depicted in the various figures will now be presented. It should be appreciated that not all of the features of the components of the figures are necessarily described. Some of these non discussed features as well as discussed features are inherent from the figures. Other non discussed features may be inherent in component geometry and/or configuration.

DETAILED DESCRIPTION OF EMBODIMENTS OF THE INVENTION

Figure 1:
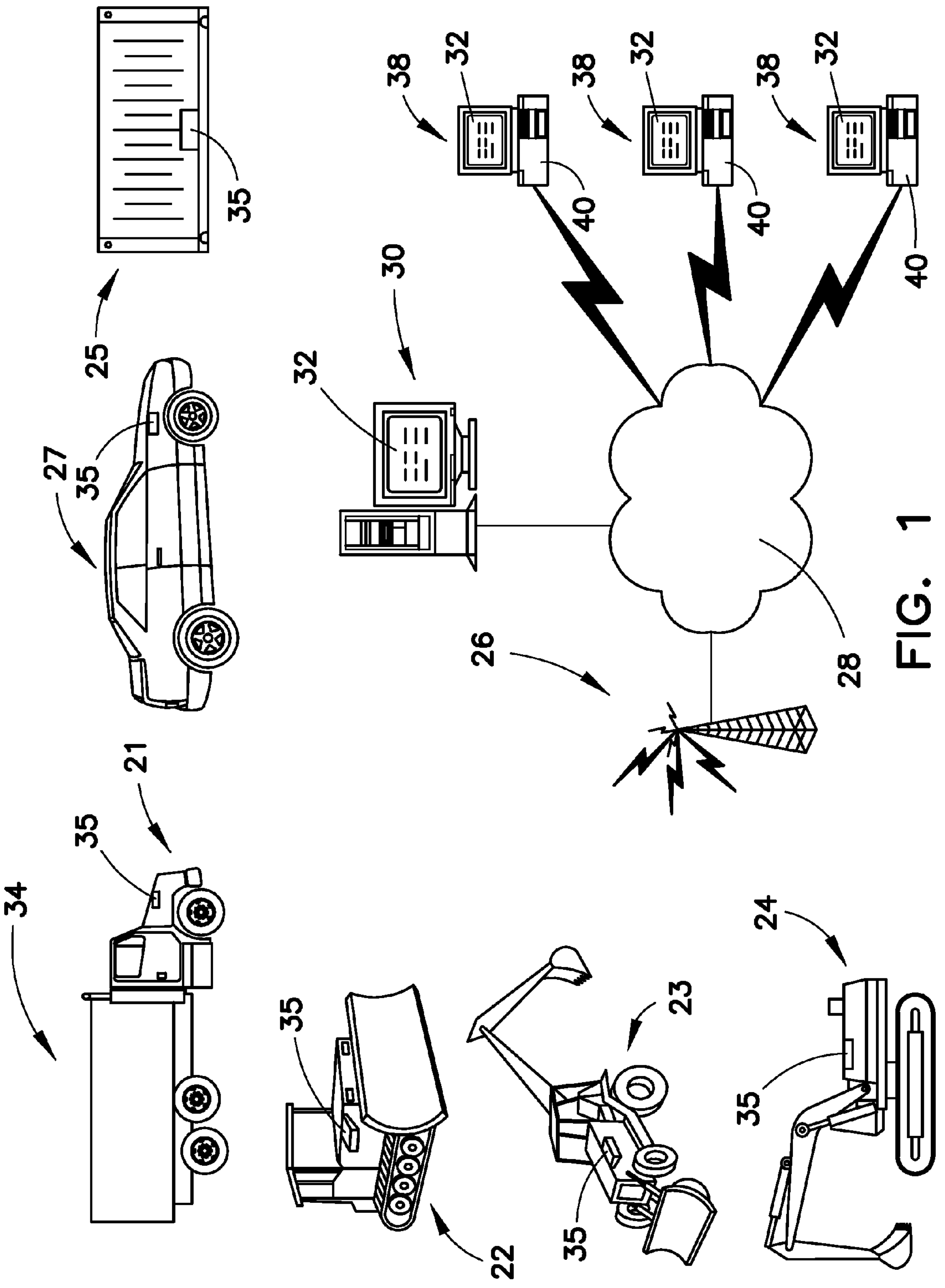
FIG. 1 depicts a diagrammatic view of an exemplary vehicle monitoring system fashioned in accordance with the present invention, illustrating its use relative to various vehicles, the vehicle monitoring system having a communications network, a server receiving communications from the communication network, and a plurality of network access terminals communicating with the server in accordance with the present invention.

Referring to FIG. 1, there is depicted a system 33 for monitoring one or more vehicles such as, but not limited to, a bulldozer 22, backhoe 23, dump truck 21, automobile 27, or a cargo container 25 (collectively hereinafter referred to as a vehicle 34) in accordance with the present principles. The system 33 includes an electric vehicle monitoring device (or monitoring device) 35 that is associated with each vehicle 34 being monitored (e.g. 21, 22, 23, 24, 25, and 27), with the monitoring device 35 having the ability to systematically detect, collect, store, interpret and/or transmit data relating to the use of a host vehicle 34 and to detect, collect, store, interpret and/or transmit operational data of a host vehicle 34 (collectively, vehicle data). In accordance with the principles of the present invention, the monitoring device 35 utilizes a power consumption management scheme to conserve, regulate and/or manage consumption of power from a host power source. The power consumption management scheme makes systematic determinations based upon the detected vehicle operational data as to the power consumption operating mode in which to place the monitoring device 35. The monitoring device 35 thus consumes power (e.g. current) from the host power source in accordance with the current power consumption operating mode.

Figure 8:
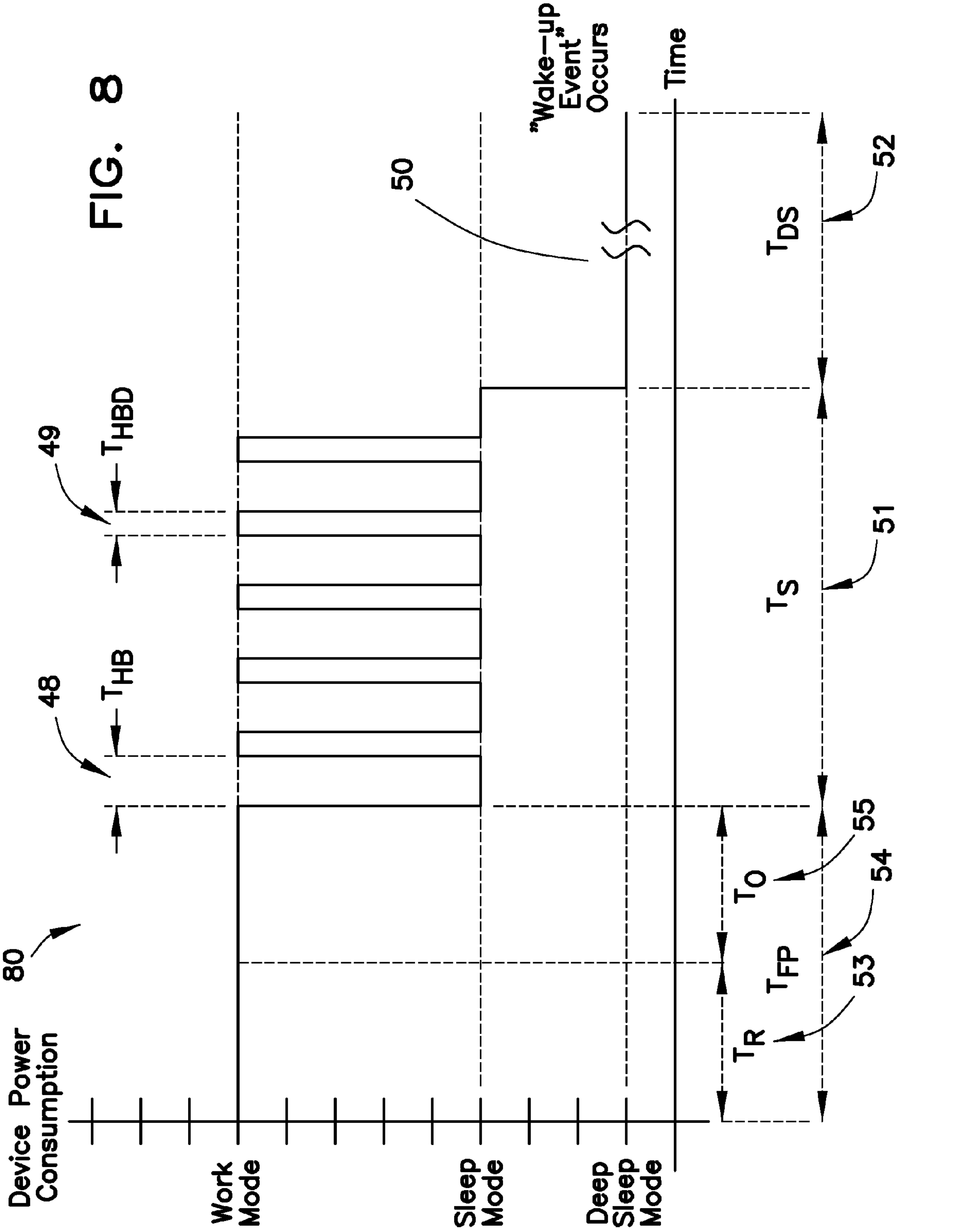
FIG. 8 is a graph depicting timing events and parameters related to the various power consumption modes used by the power consumption management scheme.

The monitoring device 35 also has the ability to establish two-way communication with the communications network 26. For example, in an outgoing transfer of data, the controller 44 transmits the vehicle data from the antenna 29 to a wireless communications network 26, which then communicates the vehicle 34 data to the Internet 28, which then transfers the vehicle data to a server 30. From the server 30, an end-user has access to reports 32 using network access devices 38 such as PC's 40 to monitor the usage of one or more vehicles 34. In an incoming transfer of data to the monitoring device 35, an end-user sends various operational commands related to the operation of the monitoring device 35. For example, the end-user may modify one or more parameters of the power consumption management system as illustrated in FIG. 8 by sending an operational command through a network access device 38, which communicates with the Internet, which transfers the operational command through the communications network 26 to the antenna 29. At such time when the monitoring device 35 receives an operational command, the monitoring device 35 is reconfigured to implement the operational command. It should also be noted that operational commands may also be downloaded to the monitoring device 35, and vehicle data may be uploaded by an access device 38 through a hard-wire connection or a local wireless connection such a local area network, infrared, or Bluetooth for example.

According to alternative embodiments of the present disclosure, reports 32 may be accessed or operational commands may be sent to the monitoring device 35 using PDA's, cell phones having computing capabilities, handheld devices, or any other portable or stationary access devices know to those of ordinary skill in the art. All such devices are considered to be access devices 38. According to alternative embodiments of the present disclosure, the data is transmitted at predetermined timed intervals throughout the day or continuously. According to alternative embodiments of the present disclosure, the vehicle data may be transferred to the server 30 by the monitoring device 35 in raw form as gathered by the sensors 31, in some manipulated form, or in a form that is readily readable by a human without the need for specialized deciphering/processing software to be resident within the access device 38. Such deciphering/processing software does not include standard office software such as a word processor, spreadsheet program, or other standard office software. For example, the monitoring device 35 may make directly available to the access device 38 a finished report in Microsoft Word format, Xcel, Adobe Reader, or some other human readable format.

Figure 2:
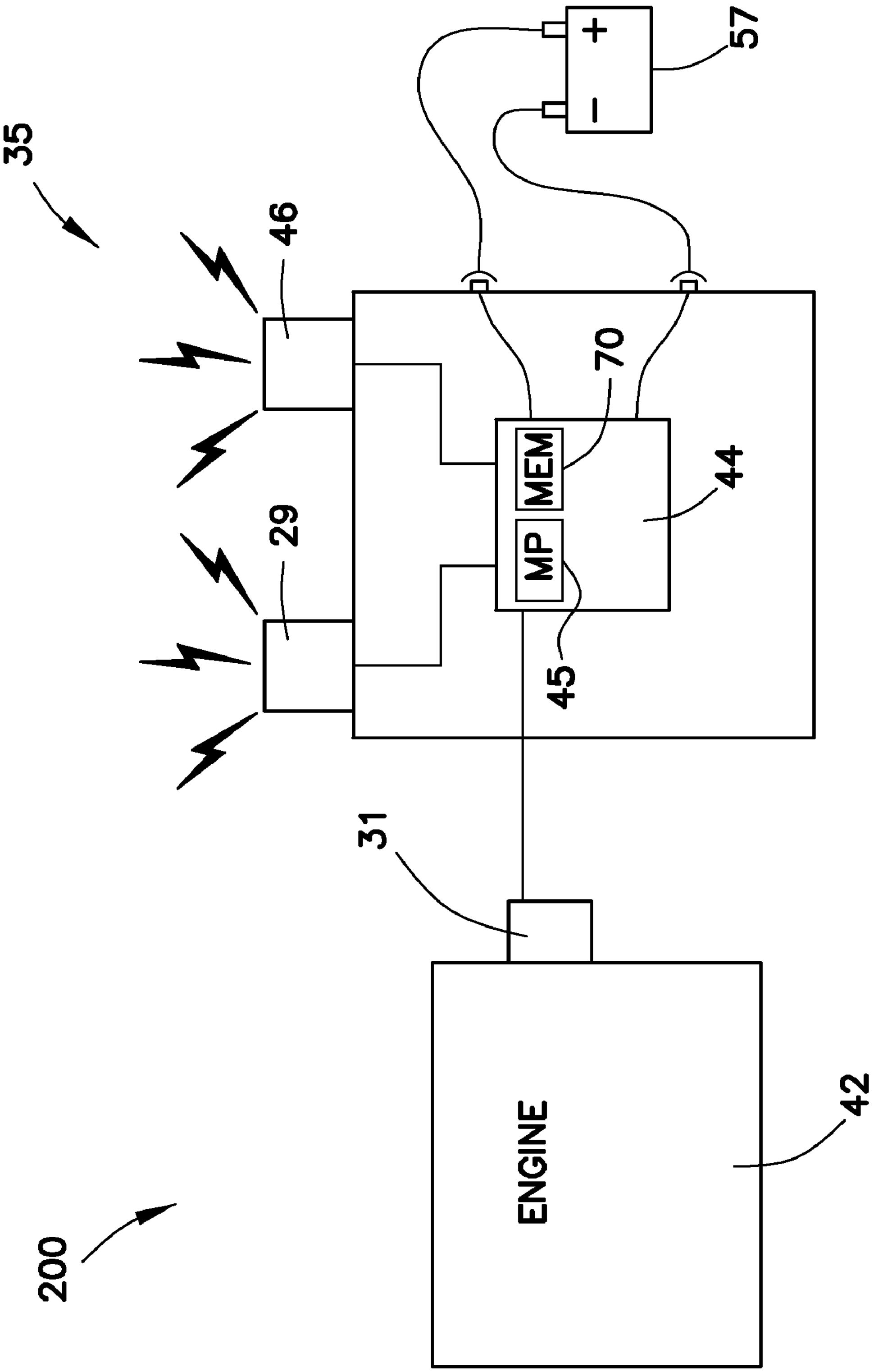
FIG. 2 depicts a diagrammatic view of an exemplary vehicle monitoring system for use with one of the vehicles from FIG. 1 showing a sensor coupled to an engine, an electronic vehicle monitoring device fashioned in accordance with the principles of the present invention, a transmitter, an external host power source, and an antenna.

Referring to FIG. 2, there is illustrated a system 200 for monitoring a vehicle 34. The system 200 includes a monitoring device 35, external power source (i.e. battery) 57, and sensor(s) 31 connected to an engine 42. The sensor 31 represents one or more sensors that are disposed about an engine 42. The monitoring device 35 is preferably, but not necessarily, in hard-wired communication with one or more sensors 31 that detects data relating to one or more operational states and/or uses of the vehicle 34 being monitored. A sensor 31 includes, but is not limited to, those devices which monitor: vehicle acceleration, engine rpm, engine oil pressure, engine water temperature, oil temperature, transmission fluid temperature, vehicle global position, engine oil temperature, transmission temperature, transmission engagement, vehicle movement, and the level of charge of an internal battery 47 and/or the external power source 57 if so equipped. Each of the aforementioned sensors is collectively or individually herein referred to as a sensor 31. The monitoring device includes a controller 44 (electronic processing) having a microprocessor 45 or the like, memory 70 of one of various types, and software or program instructions stored in the memory 70 and/or resident in the microprocessor to: 1) detect, collect, interpret, store, and transmit vehicle data, 2) implement the present power consumption management scheme, and 3) perform other functions necessary to carry out the features of the present invention such as receiving operational commands from an end-user to reconfigure the monitoring device 35 as explained herein.

According to the embodiment shown with respect to the monitoring system 200, the monitoring device 35 includes a GPS antenna 46 that communicates with satellites (not shown). Also included is an antenna 29 that transmits vehicle data (one or both of vehicle use data and vehicle operational data) and work mode status times, which are stored by controller 44 and subsequently or simultaneously transferred to the communications network 26 which communicates the vehicle operational data to a server 30 through the Internet 28. Once again, the present invention also has the ability to establish two-way communication with the communications network 26. This two-way communication allows the monitoring device to receive operational commands from the end-user through an access device 38 which are processed by the monitoring device 35 to reconfigure its power consumption management scheme and thus its operation. It is also noted that the monitoring device 35 would not necessarily have to incorporate an antenna 29, a GPS antenna 46, or any other mechanism to communicate with a communications network 26. Instead, the host vehicle data 34 could be downloaded directly to an access device 38 and the operational commands could be uploaded to an access device 38 through a hard-wired connection, a local area wireless network, short range wireless connection, infrared or other similar direct connection to the monitoring device 35.

Figure 3:
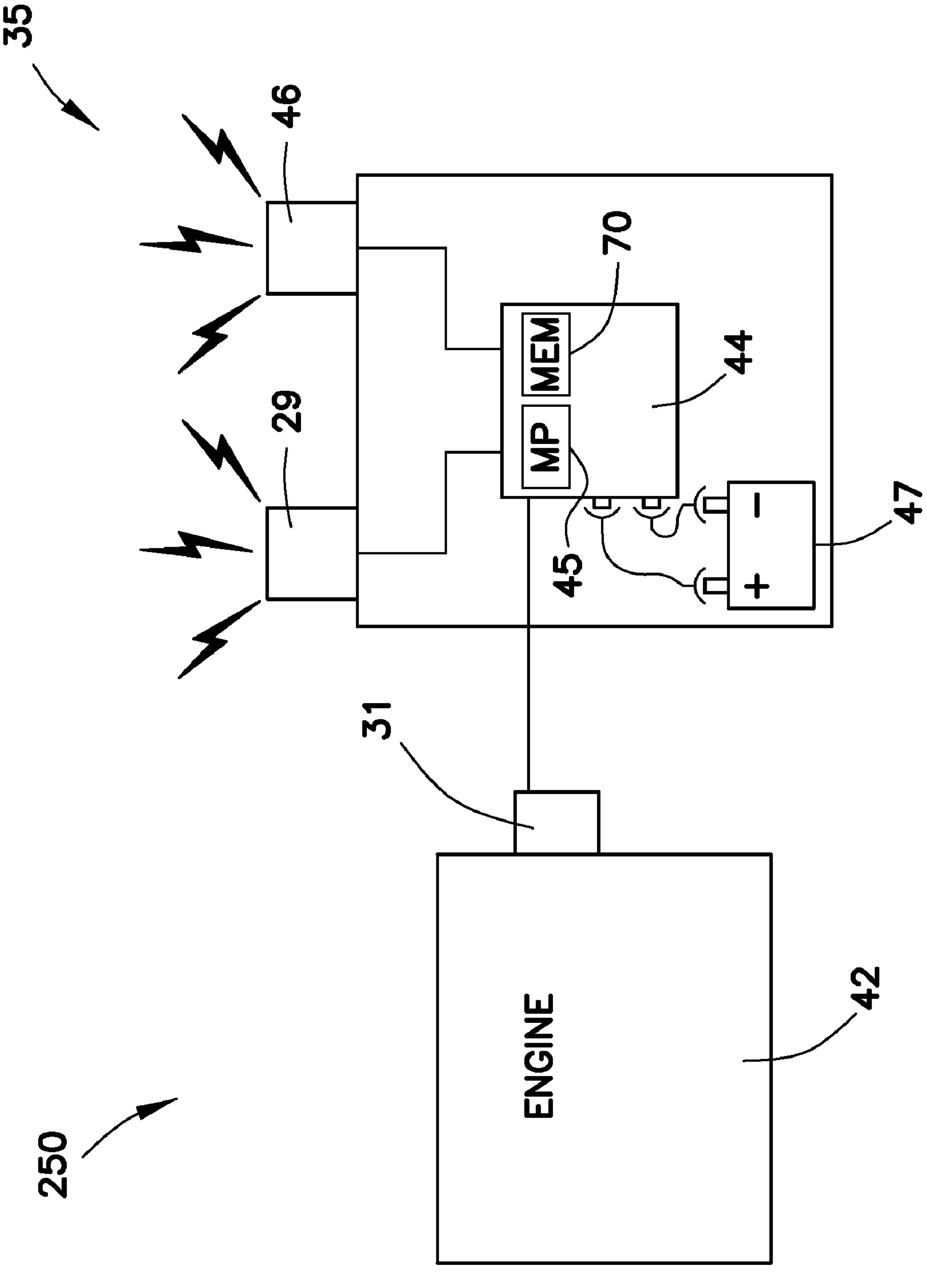
FIG. 3 depicts a diagrammatic view of another exemplary vehicle monitoring system for use with one of the vehicles from FIG. 1 showing a sensor coupled to an engine, an electronic vehicle monitoring device fashioned in accordance with the principles of the present invention, a transmitter, an internal power supply, and an antenna.

The monitoring device 35 of the system 200 receives its electric operational power through an external host power source 57. FIG. 3 illustrates another embodiment of a system 250 heaving features and/or components of the system 200 as set forth in FIG. 2, with the exception that the system 250 of FIG. 3 shows a monitoring device 35 that incorporates an internal battery 47 as the power source. Such internal battery 47 could be utilized for example when the monitored vehicle does not have a host power source to energize the monitoring device 35. It is also noted that both an internal battery 47 and an external power source 57 could be simultaneously employed to energize the monitoring device 35. In such a configuration the monitored vehicle could utilize its charging system to recharge the internal battery 47 and the external power source 57.

In operation the monitoring device 35 systematically monitors the sensors 31 to provide vehicle operational data to the power consumption management scheme. The monitoring device 35 is disposed to adjust the electrical current it consumes from a host power source (such as the internal battery 47 of FIG. 3, and/or the external power source 57 of FIG. 2) based upon the power consumption management scheme's interpretation of vehicle operational data. As a result of such interpretation, the monitoring device 35 makes systematic determinations as to whether conditions are present which necessitate placing itself into one of the following operational modes: 1) in work mode where full current is drawn from the host power supply to collect and transmit vehicle data to the communications network 26, and to also receive operational commands from an end-user; 2) in transport mode where full current is drawn and heartbeat data regarding the location of the vehicle is collected and transmitted to the communication network; 3) in sleep mode where less than full current is drawn until the monitoring device periodically wakes-up to transmit data in "heartbeats" to the communications network 26; or 4) in deep sleep mode where low current is drawn to operate only hard-wired sensors to detect changes in vehicle operational data which, when present, would signify an operational state change of the vehicle being monitored.

Figure 4:
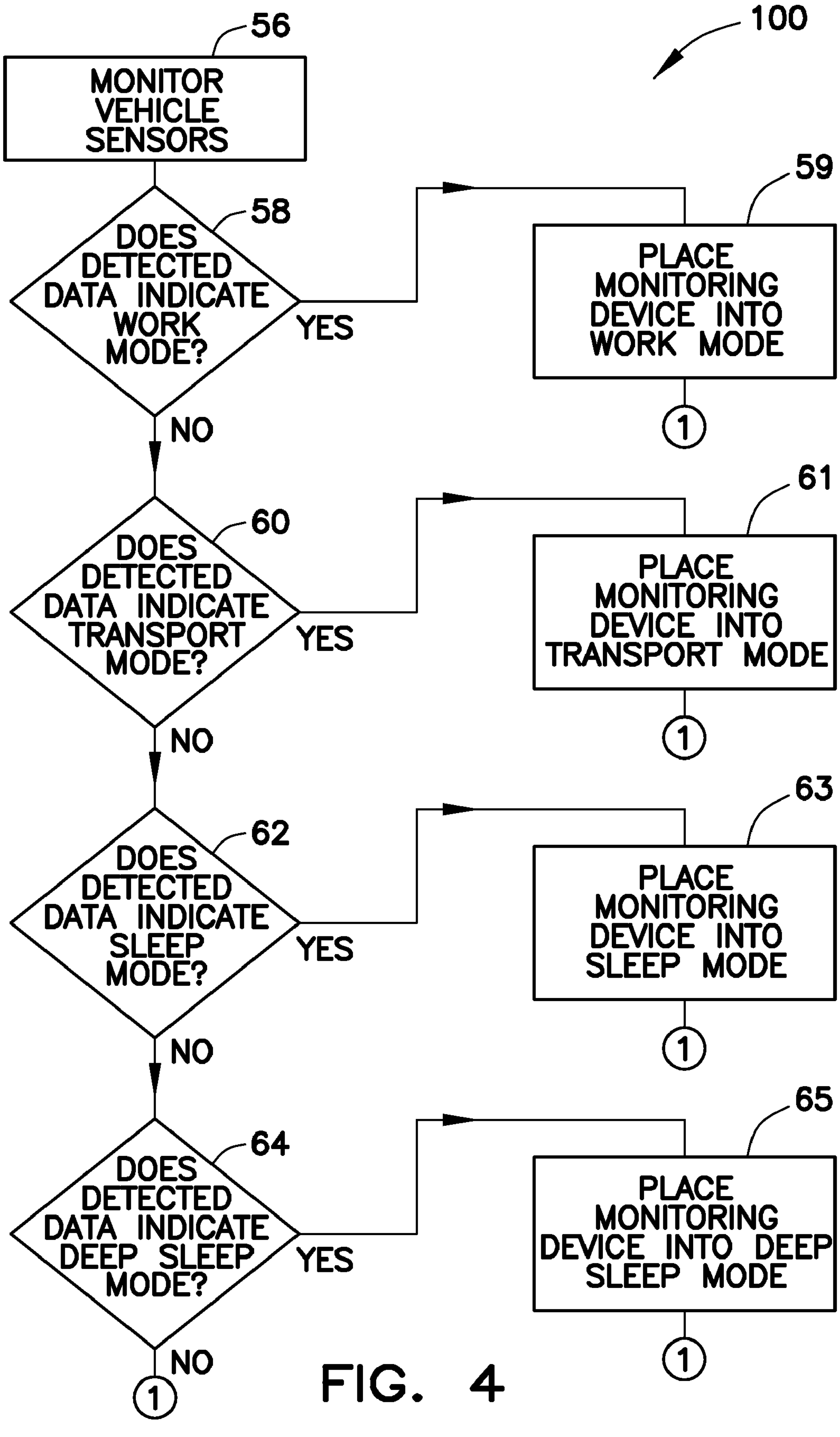
FIG. 4 is a logic flow chart illustrating an exemplary method of monitoring a vehicle in accordance with the principles of the present invention.

Referring to FIG. 4, there is illustrated a logic flow diagram 100 setting forth a method of operation of a monitoring device 35 which utilizes the present power consumption management scheme as described above. The power consumption management scheme of the monitoring device 35 begins by monitoring the sensors 31 to detect or receive vehicle operational data (box 56). Based upon the information interpreted from the sensor 31 data, the monitoring device 35 first discerns whether conditions are present to put itself into the work mode (box 58). If conditions are present which necessitate placing the monitoring device 35 into work mode, the process skips to box 59 where the monitoring device is placed into work mode as more fully below. If conditions are not present which necessitate placing the monitoring device 35 in work mode, the process skips to box 60.

Based upon the information interpreted from the sensor 31 data, the monitoring device 35 next discerns (box 60) whether conditions are present to put itself into the transport mode. If conditions are present which necessitate placing the monitoring device 35 into transport mode, the process skips to box 61 where the monitoring device is placed into transport mode as described more fully below. If conditions are not present which necessitate placing the monitoring device 35 into the transport mode, the process skips to box 62.

Based upon the information interpreted from the sensor 31 data, the monitoring device 35 next discerns whether conditions are present to put itself into the sleep mode (box 62). If conditions are present which necessitate placing the monitoring device 35 into sleep mode, the process skips to box 63 where the monitoring device is placed into sleep mode as more fully below. If conditions are not present which necessitate placing the monitoring device 35 into sleep mode, the process skips to box 64.

Based upon the information interpreted from the sensor 31 data, the monitoring device 35 next discerns whether conditions are present to put itself into the deep sleep mode (box 64). If conditions are present which necessitate placing the monitoring device 35 into deep sleep mode, the process skips to box 65 where the monitoring device is placed into deep sleep mode as more fully described below. If conditions are not present which necessitate placing the monitoring device 35 in deep sleep mode, the process loops back to box 58 where the logic set forth in this logic flow diagram 100 repeats itself until the monitoring device sensor 31 detects data which necessitates the monitoring device 35 placing itself into a different operational mode, as more fully set forth below.

It should be understood and appreciated that any type of vehicle may be monitored so long as it has the ability to perform a work function. A work function is generally described as a physical function or state of being that occurs when a vehicle is being employed to perform a task associated with its intended work purpose. Of course the definition of work functions for one type of vehicle 34 may be very different from the work functions assigned to another type of vehicle 34. In any event, the monitoring device 35 operates at full power in work mode when the power consumption management scheme detects the presence of a work function (i.e. the vehicle is in a work state). Operating in work mode means that the monitoring device 35 continues to power the sensors 31, the wireless modem, radio frequency devices such as communicators, a GPS device, the controller 44, and associated electrical circuits. During work mode operation the monitoring device 35 transmits data from the antennas 29 or transmitters 46 periodically in bursts ("heartbeats") at pre-configured time intervals. During work mode operation the monitoring device also has the ability to receive operational commands from an access device 38 (either by utilizing a communications network 26, a hard-wired connection, or a local wireless network) which are utilized by the monitoring device to alter or reconfigure the power consumption management scheme and thus the operational functionality of the monitoring device 35.

Some vehicles 34 (such as a bulldozer 22, dump truck 21, backhoe 23 or automobile 27) have a work function associated with being physically propelled by their respective engines. This movement is detected by one or more sensors 31 which detect or indicate physical movement or travel. So long as the vehicle 34 is moving across the earth by power of its engine, and the sensor 31 detects said movement, the monitoring device 35 assumes that a work function is being performed and will therefore place itself into the work mode.

In some instances vehicles 34 may also have an associated work function that is not related to being propelled across the earth. For example, a backhoe 23 might be stationary while using its digging implement to perform a work function such as digging in the earth. To detect the digging work function, one or more accelerometers (or other suitable sensors) are employed to detect movement of the backhoe 23 arm while it works; or, engine sensors may be employed to determine whether the engine is at an idle state, under a load, or at an increased rpm level thus indicating that a work function is being performed.

Where a vehicle 34 does have a work function associated with being propelled across the earth by its engine, and such engine is inoperable, and the vehicle 34 is nevertheless moving across the earth, the monitoring device 35 considers the vehicle 34 to be in a transport state. The power consumption management scheme detects this transport state and places the monitoring device 35 into the transport mode. In transport mode the monitoring device 35 remains in work mode with the exception that the frequency for transmitting data to the communications network 26 regarding the location, speed, and direction of the vehicle 34 is typically increased. In transport mode, as soon as movement is no longer detected (so long as there is no work function detected) the power consumption management scheme places the monitoring device 35 back into the last mode of operation prior to being placed in the transport mode. Should a work function be detected at any time during the transport mode, the monitoring device 35 is immediately placed into work mode.

When the power consumption management scheme does not detect sensor 31 data which creates a suitable condition for placing the monitoring device 35 in either the work mode or the transport mode, the power consumption management scheme places the monitoring device 35 in one of either the sleep mode or deep sleep mode. The method used by the power consumption management scheme to switch the monitoring device 35 between work mode operation and one of the sleep mode or deep sleep mode is fully explained in FIG. 8. FIG. 8 also shows the various levels of electric current consumption in relation to the various modes of operation of the monitoring device 35, as managed by the current power consumption management scheme.

At such time when the monitoring device 35 detects the presence of a work function, the monitoring device 35 remains in the work mode operation. During the work mode operation counter $T_R$ accumulates the time in which the monitoring device remains in work mode operation, which is defined as time segment 53. As soon as the monitoring device 35 no longer detects a work function, time counter $T_O$ is initiated to accumulate time segment 55 in which the monitoring device 35 nevertheless remains in work mode after a work function is no longer detected by the power consumption management device. At such time when time segment 55 reaches a predefined limit, the monitoring device 35 puts itself into sleep mode operation. The power consumption management device also accumulates counter $T_{FP}$ which represents the total segment of time 54 wherein the monitoring device 35 is in work mode operation. Time segment 54 equals time segments 53 and 55.

Upon being placed into the sleep mode, counter $T_{HB}$ is initiated to monitor the predefined period of time which must pass, which is defined as time segment 48, before the monitoring device 35 is temporarily awakened to work mode. Upon being awakened into work mode, counter $T_{HBD}$ is initiated to monitor the predefined period of time which must pass, which is defined as time segment 49, before the monitoring device is once again placed back into sleep mode operation. At any time when the monitoring device is placed into sleep mode operation from work mode operation, counter $T_S$ is initiated to accumulate the total amount of time which must pass, which is defined as time segment 51, before the monitoring device is placed into deep sleep mode operation. Time segment 51 equals time segments 48 and 49.

Upon being placed into deep sleep mode operation, counter $T_{DS}$ is initiated which simply accumulates the period of time, defined as time segment 52, in which the monitoring device 35 remains in deep sleep mode.

It is important to understand that, as discussed above, the time parameters: $T_R$, $T_O$, $T_{FP}$, $T_{HB}$, $T_{HBD}$, $T_S$, and $T_{DS}$ may be remotely configured by the end user. By transmitting an operational command to the monitoring device 35, which alters one or more of the aforementioned time parameters, the end user may customize the operational characteristics of power consumption management scheme to optimize the electrical power current being drawn from the internal battery 47 and/or the external power source 57 (host power source), as the case may be. For example, as set forth in FIG. 8 as previously discussed, $T_O$ is the time segment 55 where the monitoring device 35 remains in the work mode after the monitoring device 35 no longer detects a work function. Altering this parameter will vary the time the monitoring device 35 remains in work mode after the power consumption management scheme no longer detects a work function. Modifying parameter $T_{HB}$ would alter the time segment wherein the monitoring device 35 remains in the sleep mode before periodically awakening to work mode (in order to transmit and receive data to/from the communications network 26). Modifying parameter $T_{HBD}$ would alter the periodic time segment 49 wherein the monitoring device 35 remains in work mode after being awakened from the sleep mode by time parameter $T_{HB}$, before reverting back into the sleep mode.

Figure 5:
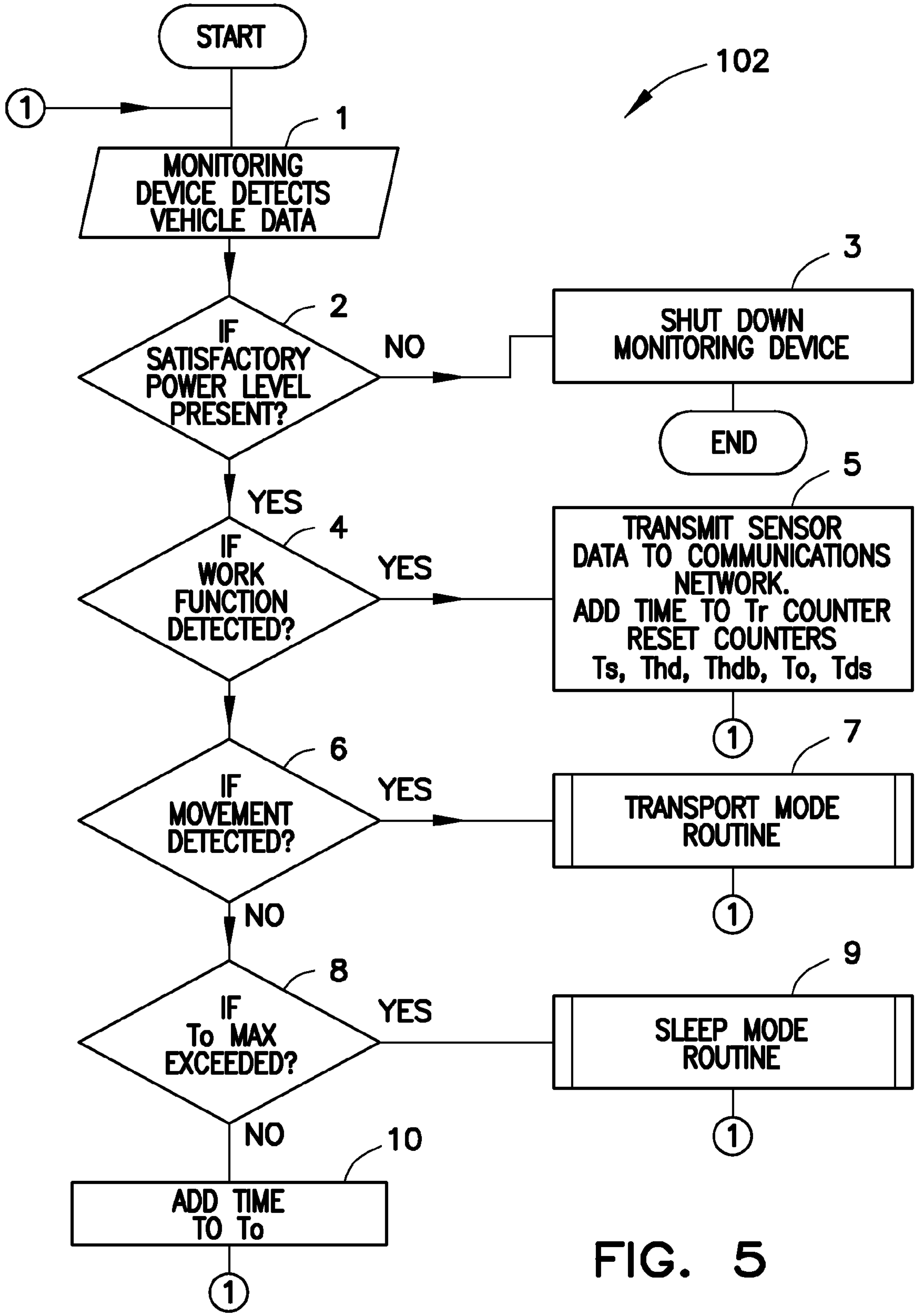
FIG. 5 is a logic flow chart depicting a main logic process utilized by the power consumption management scheme to monitor the operational status of a host vehicle.

As shown in FIGS. 2 and 3, the controller 44 is generally configured to perform the logic as shown in the figures. Referring to FIG. 5, a logic flow chart is provided which illustrates a general logic of the power consumption management device resident within the monitoring device 35 and stored within the controller 44.

Figure 6:
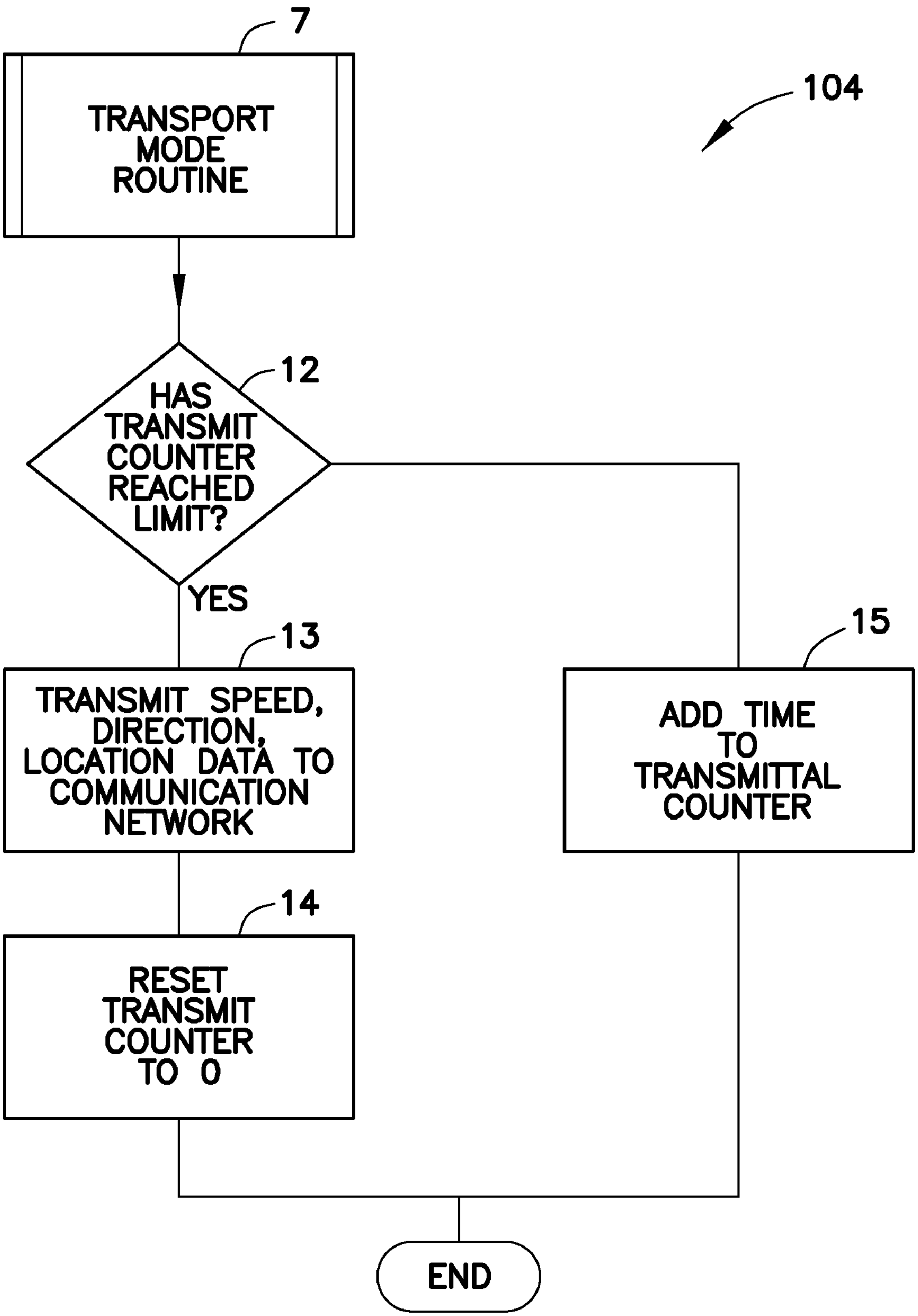
FIG. 6 is a logic flow chart depicting a transport logic process utilized by the power consumption management scheme to monitor the operational status of a host vehicle.
Figure 7:
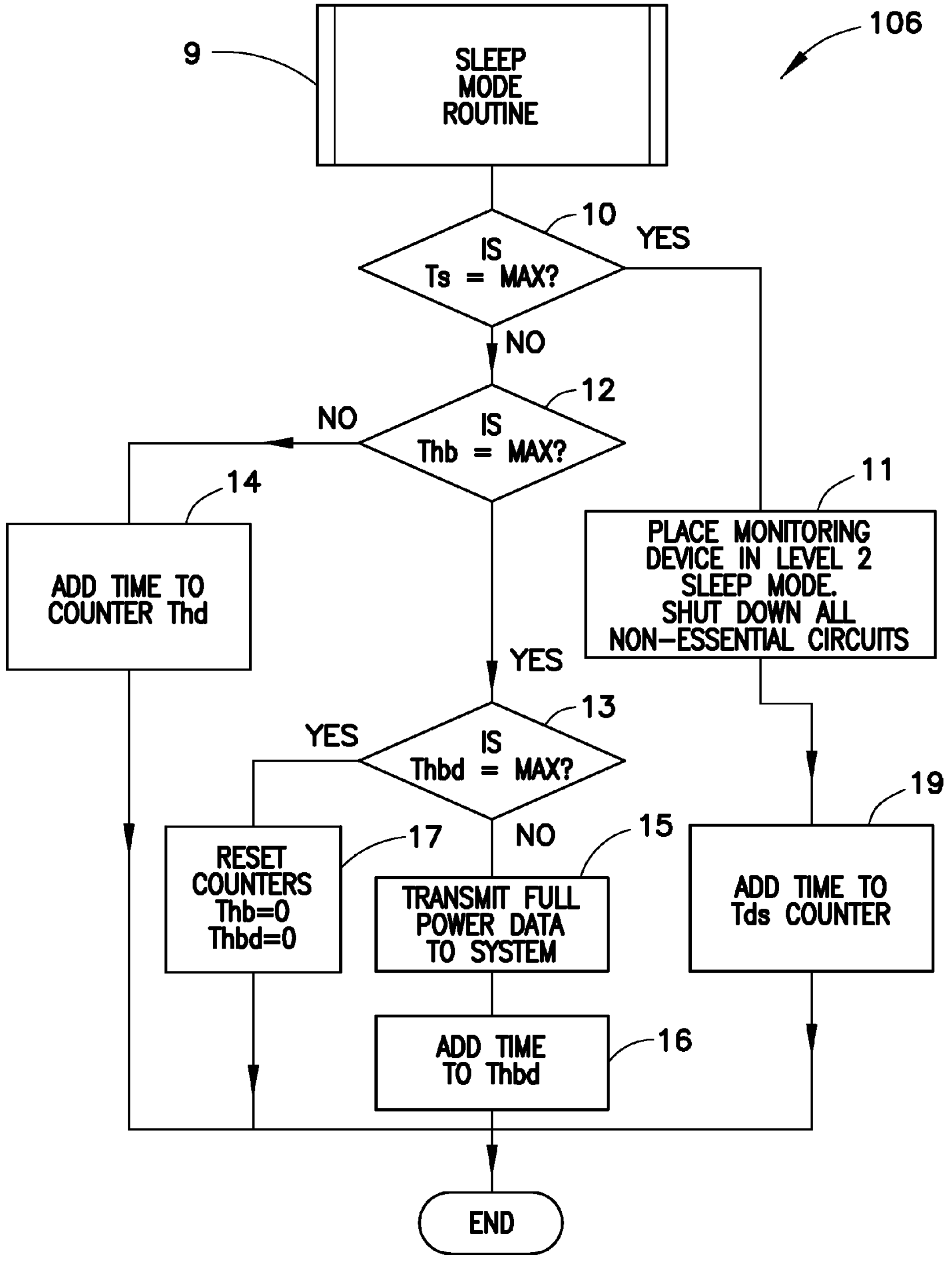
FIG. 7 is a logic flow chart depicting a combination sleep mode and deep sleep mode logic process utilized by the power consumption management scheme to monitor the operational status of the host vehicle.

FIGS. 5, 6, and 7 illustrate logic flow diagrams 102,104, and 106 respectively which set forth a method of operation of a monitoring device 35 which utilizes the present power consumption management scheme as described above. Logic flow chart 102 illustrates the main logic of the power consumption management scheme:

Box 1 represents the monitoring device 35 as connected to one or more sensors 31. The controller 44 is programmed to receive the input data from the sensors 31.

Box 2 asks whether the host power source has enough stored energy (as predefined by the end-user) to continue supplying the monitoring device 35. If the internal battery 47 or external power source 57 do possess the predetermined energy level, the process skips to box 4. If the internal battery 47 (if so equipped) and/or the external power source 57 fall below said predetermined level, the monitoring device 35 shuts itself off entirely as represented by box 3. Upon the internal battery 47 and/or the external power source 57 being recharged to an acceptable level, the monitoring device 35 would optionally: automatically restart itself, require manual intervention, or would restart upon receiving a remote operational command from an end-user.

Box 4 asks whether a work function is being performed by the vehicle 34. If a work function is not detected the process skips to box 6. If a work function is detected, the process skips to box 5.

Box 5 transmits the sensor 31 data to the communications network 26 in "full power" work mode, and adds time to counter $T_R$ which keeps track of the total operational time of the vehicle 34. The following counters are reset when the monitoring device 35 operates in work mode: $T_S$, $T_{BH}$, $T_{HBD}$, $T_O$, $T_{DS}$, and the transport mode transmitter counter. Once again, it must be noted that the vehicle operational data is transmitted at predetermined (end-user defined) timed intervals throughout the day or continuously. The process then skips to box 1.

Box 6 asks whether the vehicle 34 is moving across the earth. If vehicle 34 movement is not detected, the process skips to box 8. If the monitoring device 35 does detect vehicle 34 movement, the monitoring device 35 places itself into the transport mode (box 7).

Logic flow chart 104 illustrates the transport mode operation of the power consumption management scheme:

Box 7. In transport mode the monitoring device 35 begins sending periodic "transport messages" containing current GPS information about the vehicle's 35 location, speed, and direction. The frequency at which said transport messages are sent is configurable by the end-user. Box 12 asks if the pre-configured transmitter counter maximum has been reached, meaning that it is time for the monitoring device 35 to send a transport message. If the pre-configured transmitter counter has not been reached, time is added to the transmitter counter and the process skips to box 1. If the pre-configured transmitter counter max has been reached, the monitoring device 35 transmits a transport message to the communications network 26 and the transmitter counter is reset to zero. The process then skips to box 1.

Box 8 asks whether or not $T_O$ has been exceeded. If the monitoring device 35 does not detect a work function (box 4) and does not detect movement (box 6), it examines counter $T_O$. Counter $T_O$ starts to run as soon as the monitoring device 35 detects that it is no longer performing a work function. So long as the maximum pre-configured value for counter $T_O$ is not exceeded, the monitoring device 35 continues to transmit the sensor 31 data to the communications network 26 in work mode (box 5). When the counter $T_O$ maximum has been reached, the process skips to box 9 to place the monitoring device 35 into the sleep mode.

Logic flow chart 104 illustrates the sleep mode operation of the power consumption management scheme:

Box 9 is known as the sleep mode. Box 10 asks whether the pre-configured maximum for counter $T_S$ has been reached. Counter $T_S$ is the counter which determines if the vehicle 34 has been in the sleep mode for the pre-configured amount of time necessary before placing the vehicle 34 into the deep sleep mode (box 11). If the maximum pre-configured value of $T_S$ has been met, the monitoring device 35 powers down all internal electrical circuits which are not necessary to power the sensors 31 which monitor the vehicle 34 for movement or work functions. Time is also added to counter $T_{DS}$ which is the counter that accumulates the total amount of time the vehicle remains in the deep sleep mode (box 19). The process then skips to box 1. If the pre-configured maximum value of counter $T_S$ has not been reached, the process skips to box 12.

Box 12 asks if the maximum pre-configured value for counter $T_{HB}$ has been exceeded. Counter $T_{HB}$ is the counter which accumulates the time necessary before the monitor 35 is temporarily brought out of the sleep mode to transmit the sensor 31 data to the system 33. If the maximum value for counter $T_{HB}$ is not exceeded, time is simply added to the counter and the process skips to box 1. If pre-configured maximum for counter $T_{HB}$ has been attained, the monitoring device 35 is awakened from the sleep mode and the process skips to box 15.

Box 15 asks if the maximum pre-configured value for counter $T_{HBD}$ has been exceeded. $T_{HBD}$ is the counter which accumulates the time where the monitoring device remains in work mode after being awakened from the sleep mode. If the pre-configured value for counter $T_{HBD}$ has been exceeded, counters $T_{HB}$ and $T_{HBD}$ are reset which has the effect of placing the monitoring device 35 back into the sleep mode. The process then skips to box 1. If the pre-configured value for counter $T_{HBD}$ has not been exceeded, the monitoring device 35 transmits the sensor 31 data to the communications network 26 in work mode. Time is then added to counter $T_{HBD}$, and the process skips to box 1.

While the invention has been illustrated and described in detail in the drawings and foregoing description, the same is to be considered as illustrative and not restrictive in character, it being understood that preferred embodiments have been shown and described and that all changes and modifications that come within the spirit of the invention are desired to be protected.

What is claimed is:

1. An electronic vehicle monitoring device comprising:
- electronic processing configured to detect data a) relating to use of a host vehicle and b) relating to the operation of the host vehicle;
- a communications portion in communication with the electronic processing and configured to communicate the detected data relating to the use and operation of the host vehicle to an end-user;
- an electric conduit providing electrical power to the electronic processing and the communications portion from a host electrical power source; and
- a power consumption management scheme implemented by the electronic processing and configured to manage energy consumption from the host power source by the electronic vehicle monitoring device based on the detected data related to the operation of the host vehicle.

2. The electronic vehicle monitoring device of claim 1, wherein the host power source is integral with the electronic vehicle monitoring device.

3. The electronic vehicle monitoring device of claim 1, wherein the power consumption management scheme utilizes the detected data related to the operation of the host vehicle to determine which one of various modes of operation to place the electronic vehicle monitoring device, wherein each mode of operation utilizes a different current draw from the host power source to operate the electronic vehicle monitoring device.

4. The electronic vehicle monitoring device of claim 3, wherein the various modes of operation comprise a work mode, a transport mode, a sleep mode and a deep sleep mode.

5. The electronic vehicle monitoring device of claim 4, wherein the work mode is selected by the power consumption management scheme when the detected data related to the operation of the host vehicle indicates that the host vehicle is being employed to perform a task that is associated with an intended purpose of the host vehicle.

6. The electronic vehicle monitoring device of claim 5, wherein the work mode provides for the electronic vehicle monitoring device to use a full current draw from the host power source whereby all data relating to the host vehicle may be communicated to the end user.

7. The electronic vehicle monitoring device of claim 4, wherein the transport mode is selected by the power consumption management scheme when the detected data related to the operation of the host vehicle indicates that the host vehicle is being transported by a secondary source.

8. The electronic vehicle monitoring device of claim 7, wherein the transport mode provides for the electronic vehicle monitoring device to use less than full current from the host power source whereby all detected data relating to the geographic location of the host vehicle may be communicated to the end user.

9. The electronic vehicle monitoring device of claim 4, wherein the transport mode is terminated as soon as the power consumption management scheme detects data signifying that the host vehicle is no longer being transported by said secondary source, and at such termination, the power consumption management scheme places the electronic vehicle monitoring device back to the last mode of operation prior to it entering transport mode.

10. The electronic vehicle monitoring device of claim 4, wherein the sleep mode is selected by the power consumption management scheme when the detected data related to the operation of the host vehicle indicates that the host vehicle has not been in the work mode for a predefined length of time.

11. The electronic vehicle monitoring device of claim 10, wherein the sleep mode is further defined as two alternating modes;

the first sleep mode is defined as a mode where the electronic vehicle monitoring device draws less than full current from the host power source to monitor less than all of the data from the host vehicle data, for a predefined length of time;

the second sleep mode is defined as a mode where the electronic vehicle monitoring device draws full current from the host power source in order to transfer all host vehicle data to an end user, for an predefined length of time; and at such time when either mode currently in operation exceeds its predefined length of time for continued operation, the electronic vehicle monitoring device ceases such mode and places itself into the other sleep mode, this alternating mode selection process continues in a loop fashion until the electronic vehicle monitor device places itself into another predefined mode based upon the detected data related to the operation of the host vehicle.

12. The electronic vehicle monitoring device of claim 4, wherein the deep sleep mode is selected by the power consumption management scheme when the detected data related to the operation of the host vehicle indicates that the host vehicle has exceeded a predefined length of time for remaining in the sleep mode, the electronic vehicle monitoring device remains in deep sleep mode until it places itself into another predefined mode based upon the detected data related to the operation of the host vehicle.

13. The electronic vehicle monitoring device of claim 1, wherein the communication portion is further defined as a hardwired connection between the monitoring device and an access device.

14. The electronic vehicle monitoring device of claim 1, wherein the communication portion is utilized to transmit host vehicle data to and end-user using one of a direct connection, the Internet, a cellular system, and a short range wireless connection.

15. The electronic vehicle monitoring device of claim 1, wherein the power consumption management scheme is configurable by an end-user utilizing the communication portion to transmit configuration data to the electronic vehicle monitoring device, wherein the communication portion is further defined as a direct connection, the Internet, a cellular system, and a short range wireless connection.

16. A method of monitoring a vehicle comprising the steps of:

(a) detecting 1) data relating to the use of a host vehicle, and 2) data relating to the operation of the host vehicle via an electronic vehicle monitoring device associated with the host vehicle, the electronic vehicle monitoring device deriving operational power from a host power source;

(b) employing a power consumption management scheme within the electronic vehicle monitoring device, the power consumption management scheme configured to manage energy consumption by the electronic vehicle monitoring device from the host power source based on the detected data related to the operation of the host vehicle; and (c) communicating the data relating to the use of a host vehicle to an end user.

17. The method of claim 16, wherein step (a) comprises detecting one or more data parameters relating to the operation of the host vehicle to determine if the electronic vehicle monitoring device is to be placed into one of an operating work mode, an operating transport mode, an operating sleep mode and an operating deep sleep mode.

18. The method of claim 17, wherein the operating work mode occurs while the host vehicle is being employed to perform a task associated with its intended work purpose.

19. The method of claim 18, wherein the operating work mode draws full current from the host power source in order to transfer all host vehicle data to an end-user.

20. The method of claim 17, wherein the operating transport mode occurs while the host vehicle is being transported by a secondary source.

21. The method of claim 20, wherein the operating transport mode draws less than full current from the host power source to transfer host vehicle data related to geographic location of the host vehicle.

22. The method of claim 21, wherein the operating transport mode terminates as soon as the electronic vehicle monitoring device detects that the host vehicle is no longer being transported by said secondary source.

23. The method of claim 17, wherein the operating sleep mode occurs when the host vehicle has not been in the operating work mode for a predefined length of time.

24. The method of claim 23, wherein the operating sleep mode has two alternating modes, a sleep mode wherein the electronic vehicle monitoring device draws less than full current from the host power source to monitor less than all of the host vehicle data for a predefined length of time;

and a deep sleep mode wherein the electronic vehicle monitoring device draws full current from the host power source in order to transfer all host vehicle data to the end user for a predefined length of time; and whereby when either mode one of the sleep mode or deep sleep mode currently in operation exceeds its predefined length of time for continued operation, the electronic vehicle monitoring device ceases such mode and places itself into the other of the sleep mode or deep sleep mode, such alternating mode selection process continues in a loop fashion until the power consumption management scheme places the electronic vehicle monitoring device into another one of the operating modes based upon the detected vehicle data.

25. The method of claim 17, wherein the operating deep sleep mode occurs when the host vehicle has exceeded a predefined length of time for remaining in the operating sleep mode, the electronic vehicle monitoring device remaining in the operating deep sleep mode until the power consumption management scheme places the electronic vehicle monitoring device into another one of the operating modes based upon the detected host vehicle data.

26. The method of claim 16, wherein communicating is accomplished via a hardwired connection between the electronic vehicle monitoring device and an access device.

27. The method of claim 16, wherein communicating is accomplished via transmitting vehicle data to and end-user by one of a direct connection, the Internet, a cellular system, and a short range wireless connection.

28. A system for electronically monitoring a host vehicle comprising:

an electronic vehicle monitoring device configured to detect data relating to the use and operation of a host vehicle, and having a power consumption management scheme implemented therein to manage energy consumption from the host power source by the electronic vehicle monitoring device based on the detected data related to the operation of the host vehicle;

a communications portion adapted to communicate the data to a server based upon a signal received from the electronic vehicle monitoring device; and an access device connected to the communications portion and configured to provide the operational and use data to an end user for determining whether the host vehicle is being effectively utilized.

29. The system of claim 28, wherein the power consumption management scheme provides various modes of operation, wherein each mode of operation utilizes a different current draw from the host power source to operate the electronic vehicle monitoring device.

30. The system of claim 29, wherein the various modes of operation comprise a work mode, a transport mode, a sleep mode, and a deep sleep mode.

31. The system of claim 30, wherein the work mode is selected by the power consumption management scheme when the detected data related to the operation of the host vehicle indicates that the host vehicle is being employed to perform a task that is associated with an intended purpose of the host vehicle.

32. The system of claim 30, wherein the work mode provides for the electronic vehicle monitoring device to use a full current draw from the host power source whereby all data relating to the use of the host vehicle may be communicated to the end user.

33. The system of claim 30, wherein the transport mode is selected by the power consumption management scheme when the detected data related to the operation of the host vehicle indicates that the host vehicle is being transported by a secondary source.

34. The system of claim 30, wherein the transport mode provides for the electronic vehicle monitoring device to use less than full current from the host power source whereby all data relating to the geographic location of the host vehicle may be communicated to the end user.

35. The system of claim 33, wherein the transport mode is terminated as soon as the power consumption management scheme interprets the detected data in a manner indicating that the host vehicle is no longer being transported by said secondary source, at such termination the power consumption management device places the electronic vehicle monitoring device into the last mode of operation prior to it entering transport mode operation.

36. The system of claim 30, wherein the sleep mode is selected by the power consumption management scheme when the detected data related to the operation of the host vehicle indicates that the host vehicle has not been in the work mode for a predefined length of time.

37. The system of claim 30, wherein the sleep mode is further defined as two alternating modes;

the first sleep mode is defined as a mode where the electronic vehicle monitoring device draws less than full current from the host power source to monitor less than all of the host vehicle data, for a predefined length of time;

the second sleep mode is defined as a mode where the electronic vehicle monitoring device draws full current from the host power source in order to transfer all host vehicle data to an end user, for an predefined length of time:

at such time when either mode currently in operation exceeds its predefined length of time for continued operation, the electronic vehicle monitoring device ceases such mode and places itself into the other sleep mode, this alternating mode selection process continues in a loop fashion until the electronic vehicle monitoring device places itself into another predefined mode based upon the host vehicle data.

38. The system of claim 30, wherein the deep sleep mode is selected by the power management scheme when the detected data related to the operation of the host vehicle indicates that the host vehicle has exceeded a predefined length of time for remaining in the sleep mode, the electronic vehicle monitoring device remains in deep sleep mode until the power consumption management scheme places the electronic vehicle monitoring device into another predefined mode based upon the detected operational vehicle data.

39. The system of claim 28, wherein the communication portion is further defined as a hardwired connection between the electronic vehicle monitoring device and an access device.

40. The system of claim 28, wherein the communication portion is utilized to transmit host vehicle data to and end-user using one of a direct connection, the Internet, a cellular system, and a short range wireless connection.

41. The system of claim 28, wherein the power consumption management scheme is configurable by an end-user utilizing the communication portion to transmit configuration data to the configurable power consumption management scheme, wherein the communication portion is further defined as a direct connection, the Internet, a cellular system, and a short range wireless connection.

* * * * *